United States Patent
Chikada

(10) Patent No.: US 7,869,772 B2
(45) Date of Patent: Jan. 11, 2011

(54) MOBILE PHONE AND USE MANAGEMENT SYSTEM THEREOF

(75) Inventor: Takayuki Chikada, Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 1086 days.

(21) Appl. No.: 11/452,775

(22) Filed: Jun. 14, 2006

(65) Prior Publication Data

US 2006/0293084 A1 Dec. 28, 2006

(30) Foreign Application Priority Data

Jun. 15, 2005 (JP) .............................. 2005-174470

(51) Int. Cl.
  *H04B 1/38* (2006.01)
(52) U.S. Cl. .................. 455/90.3; 455/575.1; 455/575.6; 455/572; 455/553.1; 455/41.1; 455/550.1; 379/67.1; 379/88.22; 379/428.01
(58) Field of Classification Search ............... 455/41.1, 455/90.3, 550.1, 575.6, 572, 553.1, 575.1
  See application file for complete search history.

(56) References Cited

U.S. PATENT DOCUMENTS

| | | | | |
|---|---|---|---|---|
| 6,278,885 | B1 * | 8/2001 | Hubbe et al. ................. | 455/558 |
| 6,729,550 | B2 * | 5/2004 | Seita et al. ................... | 235/492 |
| 6,776,339 | B2 * | 8/2004 | Piikivi ......................... | 235/451 |
| 7,181,252 | B2 * | 2/2007 | Komsi ......................... | 455/567 |
| 7,254,415 | B2 * | 8/2007 | Okamura ................... | 455/556.1 |
| 7,266,394 | B2 * | 9/2007 | Carlson et al. .............. | 455/566 |
| 7,295,818 | B2 * | 11/2007 | Nagatomo ................ | 455/127.1 |
| 7,349,666 | B2 * | 3/2008 | Yamamoto ................. | 455/41.2 |
| 7,395,088 | B2 * | 7/2008 | Shinzaki .................... | 455/556.1 |
| 7,486,971 | B2 * | 2/2009 | Awada et al. ............... | 455/567 |
| 7,493,103 | B2 * | 2/2009 | Finley et al. ............... | 455/412.1 |
| 7,505,794 | B2 * | 3/2009 | Watanabe et al. ........... | 455/572 |
| 7,505,799 | B2 * | 3/2009 | Suzuki et al. ............. | 455/575.3 |
| 7,787,898 | B2 * | 8/2010 | Mizusawa et al. .......... | 455/522 |

FOREIGN PATENT DOCUMENTS

JP 2003-69670 10/2004

* cited by examiner

*Primary Examiner*—Marceau Milord
(74) *Attorney, Agent, or Firm*—Ladas & Parry LLP

(57) ABSTRACT

A mobile phone use management system which manages use of the mobile phone includes the mobile phone and a signal transmitting device which transmits the signal for controlling the power supply of the mobile phone. The mobile phone having a non-contact IC card function includes a mobile phone including a power unit which executes power supply of the mobile phone, a non-contact IC card unit which can execute wireless communication with an external terminal device, a power supply control unit which executes control of switching the power supply from the power unit between a power supply stopped state and a power suppliable state based on a signal received from the non-contact IC card unit, and a transmitting unit which transmits a signal for controlling the power supply to the power supply control unit when the non-contact IC card unit receives the signal for controlling the power supply from the external terminal device.

2 Claims, 3 Drawing Sheets

MOBILE PHONE AND USE MANAGEMENT SYSTEM THEREOF

CROSS-REFERENCE TO RELATED APPLICATIONS

The present application claims priority to Japanese Patent Application Number 2005-174470 filed on Jun. 15, 2005, which is incorporated herein by reference in its entirety.

TECHNICAL FIELD

The present invention relates to a mobile phone having a non-contact IC card function and a use management system thereof capable of forcibly making the mobile phone unusable in a place in which the use thereof is inhibited.

BACKGROUND ART

Recently, a mobile phone having a camera function is spread in a market, and image information taken by using the camera function of the mobile phone can be transmitted as digital data without change.

It is convenient to take a picture by using only the mobile phone having the camera function without an independent camera. However, there is such a risk that even a place in which taking pictures is inhibited is unfairly shot.

For example, a research institute and a factory including up-to-date facilities have equipments that have to be managed confidentially to outside. Thus, it is sometimes inhibited to take pictures in such places.

Also, it is sometimes inhibited that the audience take pictures by using cameras in a concert hall.

However, there can be such a method that visitors to the research institute and the up-to-date factory facilities and the audience visiting the concert hall are forced to temporarily deposit their own mobile phones at entrances of the places in which taking-picture and phone call are inhibited. At this time, there is such an information security problem that they sneak a look at information stored in the deposited mobile phones. In addition, as for the concert hall, there is such a problem that, since a large number of audience visit the hall, it takes too much time and labor to perform the management of the temporarily deposited mobile phones. Therefore, the method is not a practical solution.

As a background art, there is disclosed a technique of a mobile phone capable of switching a mode thereof in passing through an entrance gate (e.g., see Japanese Patent Applications Laid-open under No. 2003-69670).

However, in the case of the mobile phone having the camera function, even if the mode thereof is switched, it is possible to secretly take a picture unless the power thereof is switched off. Therefore, it becomes possible that the place in which taking-picture is inhibited is problematically shot.

DISCLOSURE OF THE INVENTION

The present invention has been achieved in order to solve the above problems. It is an object of this invention to provide a mobile phone and a use management system thereof capable of disabling phone call and taking-picture with a camera included in the mobile phone by making the mobile phone unusable in a place in which the phone call and the taking-picture are inhibited.

According to one aspect of the present invention, there is provided a mobile phone having a non-contact IC card function, including: a power unit which executes power supply of the mobile phone; a non-contact IC card unit which can execute wireless communication with an external terminal device; a power supply control unit which executes control of switching the power supply from the power unit between a power supply stopped state and a power suppliable state, based on a signal received from the non-contact IC card unit; and a transmitting unit which transmits a signal for controlling the power supply to the power supply control unit when the non-contact IC card unit receives the signal for controlling the power supply from the external terminal device.

When a user enters the place in which the taking-picture and the phone call are inhibited, the power supply of the above mobile phone is stopped. Even though the user having the mobile phone with the camera function enters the place, he or she cannot take pictures and call. Therefore, it is unnecessary for the user to temporarily deposit the mobile phone, and there is such an effect that unfair taking-picture can be prevented.

According to another aspect of the present invention, there is provided a mobile phone use management system which manages use of a mobile phone having a non-contact IC card function, including: the mobile phone including: a power unit which executes power supply of the mobile phone; a non-contact IC card unit which can execute wireless communication with an external terminal device; a power supply control unit which executes control of switching the power supply from the power unit between a power supply stopped state and a power suppliable state, based on a signal received from the non-contact IC card unit; and a transmitting unit which transmits a signal for controlling the power supply to the power supply control unit when the non-contact IC card unit receives the signal for controlling the power supply from the external terminal device; and a signal transmitting device which transmits the signal for controlling the power supply of the mobile phone.

In the above mobile phone use management system, if the signal transmitting device is provided at an entrance of the place in which the taking-picture is inhibited, the power supply of the mobile phone is stopped when the user having the mobile phone enters the place. Hence, even if the user having the mobile phone with the camera enters the place, he or she cannot take pictures and call. Therefore, it is unnecessary for the user to temporarily deposit the mobile phone, and there is such an effect that the unfair taking-picture and call can be prevented.

BEST MODE FOR CARRYING OUT THE INVENTION

The preferred embodiments of the present invention will now be described below with reference to the attached drawings.

Figure 1:
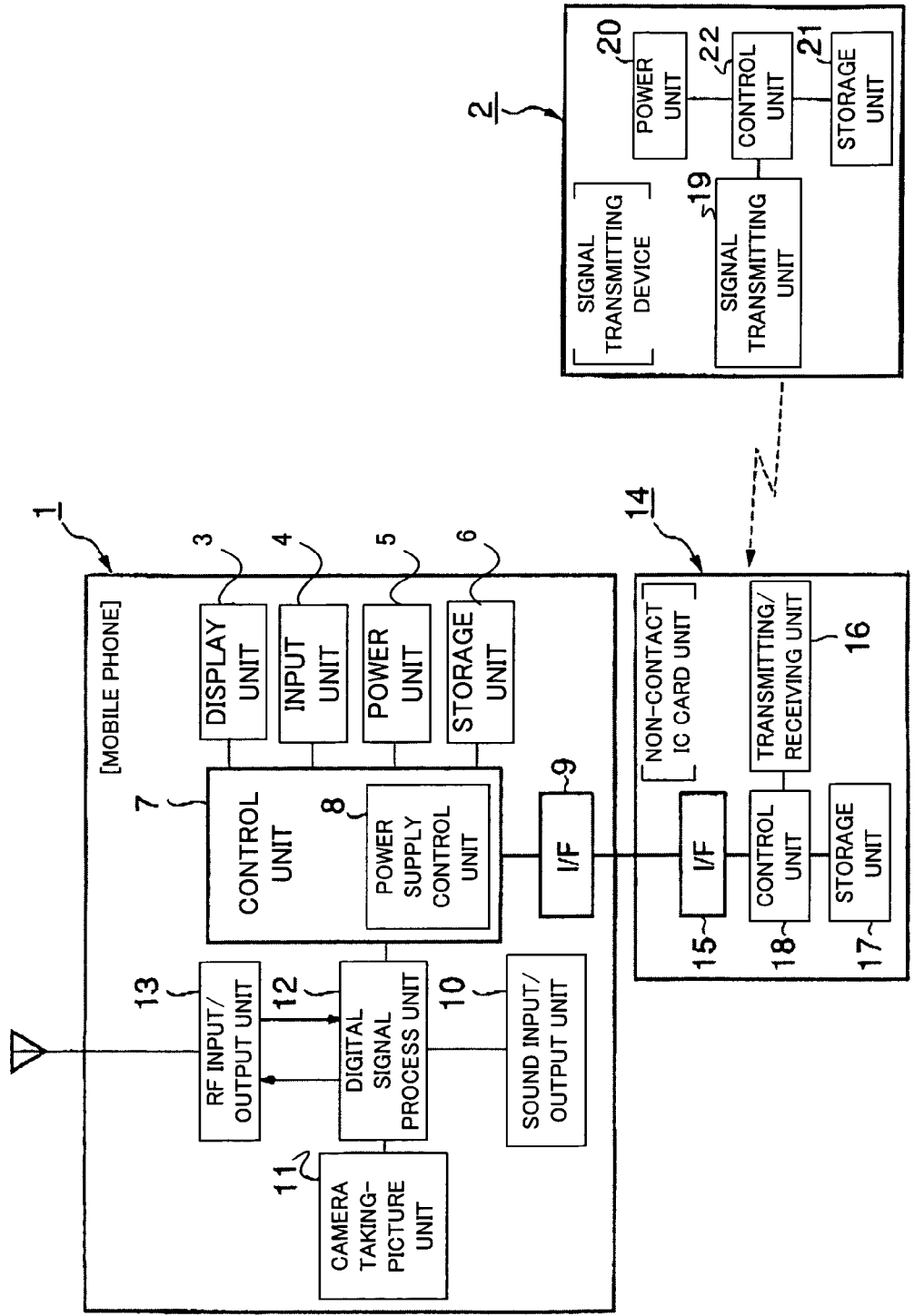
FIG. 1 is a diagram showing a block configuration of a mobile phone and a use management system thereof according to an embodiment of the present invention.
Figure 2:
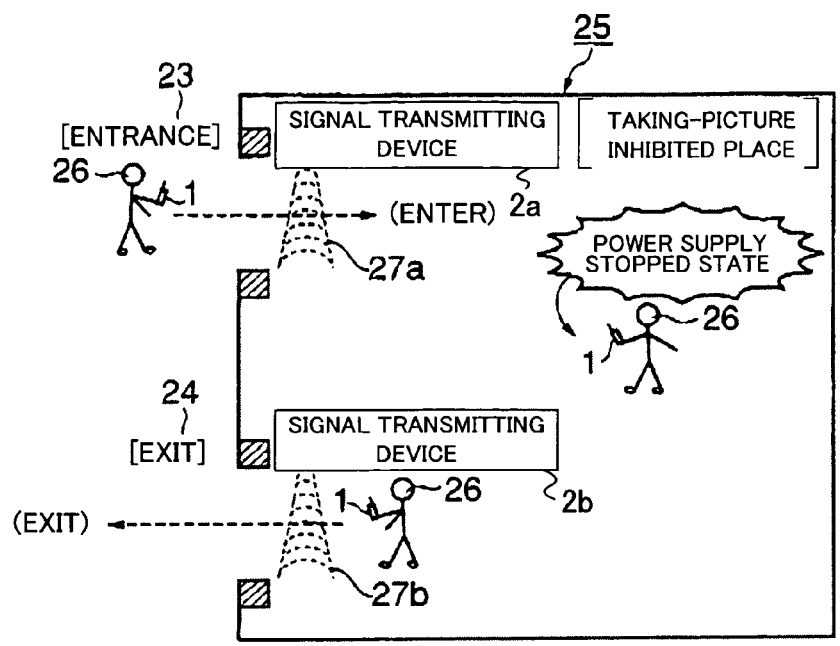
FIG. 2 is a diagram explaining an overview of the mobile phone use management system according to the embodiment of the present invention.
Figure 3:
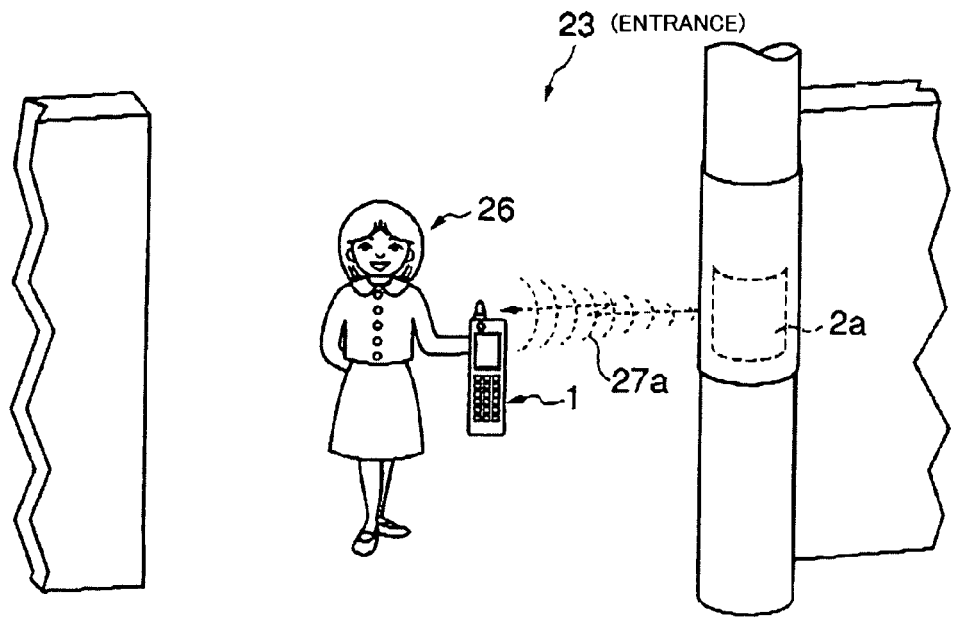
FIG. 3 is an explanation view when the mobile phone receives a signal from a signal transmitting device in the mobile phone use management system according to the embodiment of the present invention.
Figure 4:
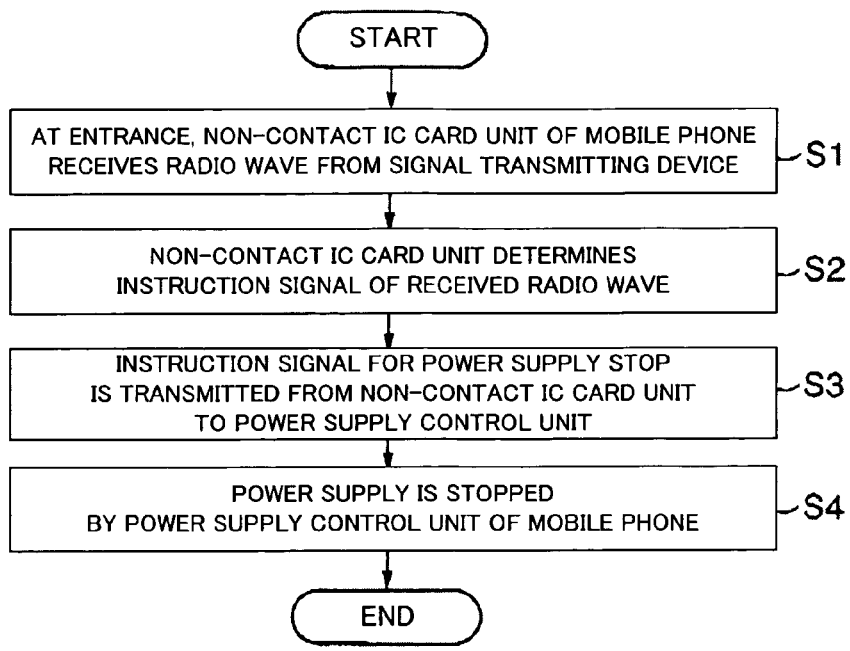
FIG. 4 is a flow chart showing a process of stopping the mobile phone use in the mobile phone use management system according to the embodiment of the present invention.
Figure 5:
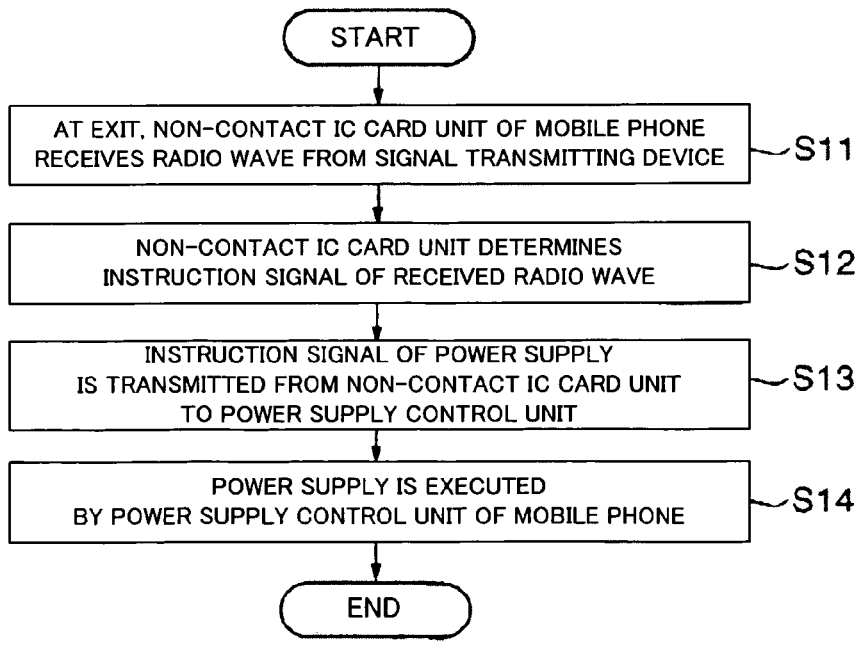
FIG. 5 is a flow chart showing a process of enabling the mobile phone use in the mobile phone use management system according to the embodiment of the present invention.

FIG. 1 is a diagram showing a block configuration of the mobile phone and the use management system thereof according to an embodiment of the present invention. FIG. 2 is a diagram explaining an outline of the mobile phone use management system according to the embodiment of the present invention. FIG. 3 is an explanation view when the mobile phone receives the signal from the signal transmitting device in the mobile phone use management system according to the embodiment of the present invention. FIG. 4 is a flow chart showing a process of stopping the mobile phone use in the mobile phone use management system according to the embodiment of the present invention. FIG. 5 is a flow chart showing a process of enabling the mobile phone use in the mobile phone use management system according to the embodiment of the present invention.

First, based on FIG. 1, a description will be given of the block configuration of a mobile phone 1 and a signal transmitting device 2 used in the mobile phone use management system according to the embodiment of the present invention.

The mobile phone 1 includes a display unit 3, an input unit 4, a power unit 5, a storage unit 6, a control unit 7, a power supply control unit 8, an interface (I/F) 9, a sound input/output unit 10, a camera taking-picture unit 11, a digital signal processing unit 12, an RF input/output unit 13.

The mobile phone 1 further includes a non-contact IC card unit 14, which is detachable.

The non-contact IC card unit 14 includes an interface (I/F) 15, a transmitting/receiving unit 16, a storage unit 17 and a control unit 18.

By the I/F 9 of the mobile phone 1 and the I/F 15 of the non-contact IC card unit 14, the signal is transmitted and received between the mobile phone 1 and the non-contact IC card unit 14.

The power supply control unit 8 of the mobile phone 1 has the function to execute the control of switching the power supply from the power unit 5 between the power supply stopped state and the power suppliable state based on the signal received from the non-contact IC card unit 14.

Namely, in the power supply control unit 8, when the control of the power supply stopped state is executed, all the functions of the mobile phone 1 are stopped. Therefore, the phone call and the taking-picture by the camera taking-picture unit 11 cannot be performed.

Therefore, when the control of the power supply stopped state is executed in the power supply control unit 8, even if normal operation for making the power switch in an ON state is executed, the power is not supplied from the power unit 5.

In the storage unit 17 of the non-contact IC card unit 14, signal information for making the mobile phone 1 in the power supply stopped state and signal information for making the mobile phone 1 in the power suppliable state are stored in advance.

After receiving the signal transmitted from the signal transmitting device 2, the non-contact IC card unit 14 determines whether the signal is the instruction signal for the power supply stop or the instruction signal for the power supply, based on the signal information stored in the storage unit 17.

Then, the non-contact IC card unit 14 transmits the instruction signal for the power supply stop or for the power supply to the power supply control unit 8 of the mobile phone 1. Thereby, the non-contact IC card unit 14 controls the power from the power unit 5.

Next, the signal transmitting device 2 will be explained.

The signal transmitting device 2 includes a signal transmitting unit 19, a power unit 20, a storage unit 21 and a control unit 22.

The storage unit 20 stores the instruction signal for the power supply stop or the instruction signal for the power supply in accordance with the position to which the signal transmitting device 2 is set.

The signal transmitting unit 19 has a function to transmit the instruction signal for a predetermined distance via the radio wave, and the instruction signal transmitted from the signal transmitting unit 19 is received by the transmitting/receiving unit 16 of the non-contact IC card unit 14 of the mobile phone 1.

Next, a description will be given of the mobile phone use management system using the mobile phone 1, based on FIG. 2 and FIG. 4.

FIG. 2 shows a sketch of a taking-picture inhibited place 25, which is a factory having up-to-date equipments, an entrance 23 and an exit 24.

At the entrance 23 and the exit 24, signal transmitting devices 2a and 2b are provided, respectively.

The radio wave is transmitted from each of the signal transmitting devices 2a and 2b so that the radio wave reaches at least a passing area of a visitor 26 passing through the entrance 23 or the exit 24.

FIG. 3 shows a relation between the mobile phone 1, which the visitor 26 passing through the entrance 23 and entering the taking-picture inhibited place 25 has, and a transmission radio wave 27a transmitted from the signal transmitting device 2a provided at the entrance 23.

As shown in FIG. 3, the mobile phone 1 of the visitor 26 passing through the entrance 23 never fails to pass through a transmission area of the radio wave 27a transmitted from the signal transmitting device 2a and receive the transmission radio wave 27a transmitted from the signal transmitting device 2a.

In addition, a transmission radio wave 27b transmitted from the signal transmitting device 2b is received when the visitor 26 exits the taking-picture inhibited place 25 via the exit 24 similarly to at the entrance 23.

The transmission radio wave 27a transmitted from the signal transmitting device 2a provided at the entrance 23 includes the instruction signal for the power supply stop, and the transmission radio wave 27b transmitted from the signal transmitting device 2b provided at the exit 24 includes the instruction signal for the power supply.

Therefore, the mobile phone 1 of the visitor 26 passing through the entrance 23 receives the radio wave 27a transmitted from the signal transmitting device 2a provided at the entrance 23, and thus receives the instruction signal for the power supply stop. Thereby, the power supply of the mobile phone 1 is stopped, and the mobile phone cannot be used.

In addition, the mobile phone 1 of the visitor 26 passing through the exit 24 receives the radio wave 27b transmitted from the signal transmitting device 2b provided at the exit 24, which enables the power supply. Thereby, the mobile phone 1 becomes usable.

As described above, in the taking-picture inhibited place 25, the power supply is stopped so that the visitor 26 cannot use the mobile phone 1 even against his or her will. Thereby, it becomes impossible to take pictures by using the mobile phone 1.

Next, a description will be given of a process of the mobile phone use management system according to the embodiment of the present invention, with reference to flow charts shown in FIGS. 4 and 5.

First, when the visitor 26 passes through the entrance 23, the non-contact IC card unit 14 of the mobile phone 1 of the visitor 26 receives the radio wave 27a transmitted from the signal transmitting device 2a (step S1).

Next, the non-contact IC card unit 14 of the mobile phone 1 determines whether the received signal is the instruction signal for the power supply stop or the instruction signal for the power supply, based on the information stored in the storage unit 17 (step S2).

Since the radio wave of the instruction signal for the power supply stop is transmitted from the signal transmitting device 2a provided at the entrance 23, the non-contact IC card unit 14 of the mobile phone 1 determines it as the instruction signal for the power supply stop, and transmits the instruction signal for the power supply stop to the power supply control unit 8 of the mobile phone 1 (step S3).

Then, the power supply control unit 8 of the mobile phone 1 receives the instruction signal transmitted from the non-contact IC card unit 14 to execute the control of stopping the power supply from the power unit 5 (step S4).

By the above-mentioned process, the visitor 26 cannot use the mobile phone 1 in the taking-picture inhibited place 25.

Next, when the visitor 26 passes through the exit 24, the non-contact IC card unit 14 of the mobile phone 1 of the visitor 26 receives the radio wave 27b transmitted from the signal transmitting device 2b (step S11).

Next, based on the information stored in the storage unit 17, the non-contact IC card unit 14 of the mobile phone 1 determines whether the received signal is the instruction signal for the power supply stop or the instruction signal for the power supply (step S12).

Since the radio wave of the instruction signal for the power supply is transmitted from the signal transmitting device 2b provided at the entrance 24, the non-contact IC card unit 14 of the mobile phone 1 determines it as the instruction signal for the power supply, and transmits the signal for the power supply to the power supply control unit 8 of the mobile phone 1 (step S13).

Then, the power supply control unit 8 of the mobile phone 1 receives the instruction signal from the non-contact IC card unit 14 to execute the control of the power supply from the power unit 5 (step S14).

By the above-mentioned process, when exiting the taking-picture inhibited place 25 and going back outside, the visitor 26 can use the mobile phone 1 again.

As described above, in the mobile phone use management system according to the embodiment of the present invention, the signal transmitting device is provided not only in the taking-picture inhibited place 25 but also in the place and facilities in which the use of the mobile phone 1 is not appropriate, as need arises. Thereby, the use of the mobile phone 1 can be controlled.

What is claimed is:

1. A mobile phone having a non-contact IC card function, comprising:
  a power unit which executes power supply of the mobile phone;
  a non-contact IC card unit which can execute wireless communication with an external terminal device; and
  a power supply control unit which executes control of switching the power supply from the power unit to an entire, physical portion of the mobile phone between a power supply stopped state and a power suppliable state, based on a signal received from the non-contact IC card unit;
  wherein the non-contact IC card unit comprises:
  a storage unit which stores signal information for making the mobile phone in the power stopped state and signal information for making the mobile phone in the power suppliable state; and
  a transmitting unit which transmits a signal for controlling the power supply to the power supply control unit, based on the signal information stored in the storage unit, when the non-contact IC card unit receives the signal for controlling the power supply from the external terminal device.

2. A mobile phone use management system which manages use of a mobile phone having a non-contact IC card function, the system comprising:
  the mobile phone; and
  a signal transmitting device which transmits a signal for controlling a power supply of the mobile phone,
  wherein the mobile phone including:
  a power unit which executes power supply of the mobile phone;
  a non-contact IC card unit which can execute wireless communication with an external terminal device; and
  a power supply control unit which executes control of switching the power supply from the power unit to an entire, physical portion of the mobile phone between a power supply stopped state and a power suppliable state, based on a signal received from the non-contact IC card unit, and
  wherein the non-contact IC card unit comprises:
  a storage unit which stores signal information for making the mobile phone in the power stopped state and signal information for making the mobile phone in the power suppliable state; and
  a transmitting unit which transmits a signal for controlling the power supply to the power supply control unit, based on the signal information stored in the storage unit, when the non-contact IC card unit receives the signal for controlling the power supply from the external terminal device.

* * * * *